(12) United States Patent
Marzano

(10) Patent No.: US 11,515,691 B2
(45) Date of Patent: Nov. 29, 2022

(54) MODULAR LOW VOLTAGE POWER DISTRIBUTION MODULE

(71) Applicant: Rockwell Automation Switzerland GmbH, Aarau (CH)

(72) Inventor: Thomas Strebel Marzano, Aarau (CH)

(73) Assignee: Rockwell Automation Switzerland GMBH

(*) Notice: Subject to any disclaimer, the term of this patent is extended or adjusted under 35 U.S.C. 154(b) by 238 days.

(21) Appl. No.: 17/039,096

(22) Filed: Sep. 30, 2020

(65) Prior Publication Data
US 2022/0102103 A1   Mar. 31, 2022

(51) Int. Cl.
*H02B 1/04*   (2006.01)
*H01H 50/04*   (2006.01)
(Continued)

(52) U.S. Cl.
CPC .............. *H02B 1/04* (2013.01); *H01H 50/04* (2013.01); *H01H 50/048* (2013.01);
(Continued)

(58) Field of Classification Search
CPC ......... H02B 1/052–0526; H01H 89/06; H01H 50/04
See application file for complete search history.

(56) References Cited

U.S. PATENT DOCUMENTS

| 5,652,420 A | * | 7/1997 | Innes | ..................... H01H 83/22 361/729 |
| 5,870,277 A | * | 2/1999 | Girard | ................. H05K 7/1465 361/600 |

(Continued)

FOREIGN PATENT DOCUMENTS

| CN | 203038864 U | 7/2013 |
| DE | 4335965 A1 | 4/1995 |

(Continued)

OTHER PUBLICATIONS

Extended European Search Report dated Jan. 31, 2022; Application No. 21191864.4-1202—(13) pages.

(Continued)

*Primary Examiner* — Robert J Hoffberg
(74) *Attorney, Agent, or Firm* — Boyle Fredrickson, SC

(57) ABSTRACT

A modular power distribution device includes a base that is snap-fit onto DIN rail. The base includes a first mounting section, configured to receive a circuit protection device, and a second mounting section configured to receive an electronically actuated power distribution device. The circuit protection device slides on to the first mounting section and includes multiple output connections. The power distribution device slides on to the second mounting section and includes multiple input connections configured to engage the output connections of the circuit protection device as the power distribution device slides on to the second mounting section. An electronic control module is snap-fit to the assembly establishing electrical connections between the electronic control module and both the circuit protection device and the power distribution device. The electronic control module includes a port by which control signals are received and feedback signals may be transmitted.

20 Claims, 6 Drawing Sheets

(51) Int. Cl.
  *H02B 1/056* (2006.01)
  *H01H 71/02* (2006.01)
  *H01H 71/08* (2006.01)
  *H01H 89/06* (2006.01)
  *H02B 1/32* (2006.01)
  *H02B 1/42* (2006.01)

(52) U.S. Cl.
  CPC ......... *H01H 71/0228* (2013.01); *H01H 71/08* (2013.01); *H01H 89/06* (2013.01); *H02B 1/056* (2013.01); *H02B 1/32* (2013.01); *H02B 1/42* (2013.01)

(56) References Cited

U.S. PATENT DOCUMENTS

| | | | | |
|---|---|---|---|---|
| 5,870,278 | A * | 2/1999 | Girard | H05K 7/1465 361/600 |
| 6,147,419 | A * | 11/2000 | Girard | H02B 1/04 361/600 |
| 6,411,500 | B1 * | 6/2002 | Kaaden | H02B 1/0565 361/624 |
| 6,452,785 | B1 * | 9/2002 | Kaaden | H01R 9/2675 361/635 |
| 6,734,380 | B2 * | 5/2004 | Gerard | H01H 71/08 200/51 R |
| 7,012,800 | B2 * | 3/2006 | Busch | H01H 89/06 361/628 |
| 10,475,614 | B2 | 11/2019 | Houbre et al. | |
| 2019/0035589 | A1 | 1/2019 | Delbaere et al. | |
| 2021/0305727 | A1 * | 9/2021 | Delbaere | H01H 71/0221 |

FOREIGN PATENT DOCUMENTS

| | | | | |
|---|---|---|---|---|
| DE | 10023966 C1 | | 11/2001 | |
| DE | 102015115197 A1 | | 3/2017 | |
| EP | 1126568 A1 | * | 8/2001 | ............ H02B 1/056 |
| EP | 3340269 B1 | | 11/2019 | |
| FR | 2761539 B1 | | 5/1999 | |
| WO | 1995023422 A1 | | 8/1995 | |
| WO | WO-2020069584 A1 | * | 4/2020 | ........... H01H 47/002 |

OTHER PUBLICATIONS

Schneider Electric; "Installation System, TeSys Quickfit for motor starter components, Components with spring terminals"; Version: 9.3—(2) pages.
Eaton; "PKZ and PKE motor-protective circuit-breakers"; 2010 CA08103002Z-EN; www.eaton.com—(79) pages.
Schneider Electric; "TeSys U: starter-controller, Standard TeSys U"; pp. 52-57—(6) pages.
Siemens AG; "SIRIUS Infeed System 3RV"; NEB 469089610000/ RS-AA/004; 3ZX1012-0RV20-7BA1; Siemens AG 2009; last updated Jul. 23, 2012; www.siemens.com/industrial-controls/technical-assistance—(14) pages.
Siemens AG; "For Efficiency and Reliability in the Control Cabinet"; The SIRIUS 3RA6 Compact Starter; Siemens AG 2011; www.siemens.com/compactstarter—(20) pages.

* cited by examiner

MODULAR LOW VOLTAGE POWER DISTRIBUTION MODULE

BACKGROUND INFORMATION

The subject matter disclosed herein relates to a modular low voltage power distribution module and, more specifically, to a modular power distribution module including a common base and modular components including a circuit breaker, a contactor or starter, and an electronic control module that may be mounted to the base without requiring tools to provide a reduced footprint and easy installation.

As is known to those skilled in the art, industrial control systems are used to control operation of a machine or process. The controlled machine or process may include multiple motors or actuators which require power at different times to achieve the desired operation. A process line, for example, may include a conveyor with multiple drive motors spaced apart along the length of the conveyor. The process line may further include a load station and an unload station at which a product is moved onto and removed from the conveyor, respectively. Additional stations between the load and unload stations may perform actions on the product, such as filling, labelling, sorting, machining, and the like. Each station may require one or more motions, each with one or more actuators, to perform the specified action at that station.

Each actuator requires power be supplied to the actuator at the proper time to achieve the desired operation. Typically, a control cabinet is provided in which a main power feed enters and a power distribution system is established within the control cabinet to supply power to each actuator. In some applications a single control cabinet may be provided or, optionally, multiple control cabinets may be provided at a central location with wiring being run from the control cabinet(s) to each actuator. In other applications, control cabinets may be distributed around the controlled machine or process with each cabinet having a power feed into the cabinet and separate power distribution systems within each control cabinet.

The power distribution system within each control cabinet includes the main power feed and multiple branches. Each branch may be configured to supply power to one actuator. The actuator may be a solenoid energizing, an electronic motor, a valve to engage a piston or the like. A typical branch will include a circuit breaker that provides overcurrent protection, a contactor or starter that is selectively actuated to provide power the actuator at a desired time, and a control circuit to enable/disable the contactor or starter and to monitor operation of the branch circuit. Historically, each of these components has been provided as a separate device. The circuit breaker may be mounted to a control panel or to a rail, such as the rail defined by Deutsches Institut für Normung (DIN) also referred to as DIN rail, where the DIN rail is mounted to the control panel. The contactor or starter is similarly mounted to the control panel or to a rail mounted on the control panel.

Electrical interconnections to supply power must be made between a main circuit breaker, receiving the power feed, and each branch circuit breaker. Additional electrical interconnections for supplying power must be made between the branch circuit breaker and the contactor or starter. Still further electrical interconnections for supplying power are made from the contactor or starter to the actuator being controlled by the branch circuit. In addition to electrical interconnections for supplying power, electrical interconnections are made for control and monitoring of the branch circuit. Each circuit breaker may be electronically actuated and/or include current transducers generating a signal corresponding to an amplitude of current flowing through the circuit breaker. The circuit breakers may also include a status signal providing feedback to a central controller, such as a programmable logic controller (PLC) or a programmable activity controller (PAC), whether the circuit breaker is open or closed. Each of these control or feedback signals requires electrical interconnections. Similarly, a contactor or starter may be electronically actuated and include feedback signals indicating whether the contact is open or closed or whether the starter is enabled or disabled. A starter may include still additional feedback signals and/or serial communications between the starter and the central controller. Each of these control signals, feedback signals, or serial communications require electrical interconnections. Multiple circuit breakers and contactors or starters may be mounted to a single control panel. The number of electrical interconnections for power and/or control on a control panel is significant, requires extensive manufacturing and assembly time, and creates potential for wiring errors.

Recently, there has been a trend to providing modules which include a circuit breaker and a contactor or starter in a single package. The circuit breaker and contactor may be mounted to a base, where the base is mounted to the control panel or DIN rail. Providing the circuit breaker and contactor in a package reduces the potential for running electrical interconnections incorrectly between two devices mounted at different locations on the control panel. However, the circuit breaker and contactor typically still require electrical interconnections to be made between the devices while mounted on the base. The potential exists for miswiring between different control signals, different power connections, or even miswiring power and control connections. Additionally, the interconnections require assembly time and are typically completed at screw terminals, requiring a screwdriver to establish the connection.

Thus, it would be desirable to provide a modular power distribution device that provides modular interconnections for ease of assembly.

It would also be desirable to provide tool-less connection and plug-in interconnections between modules mounted on a single base.

BRIEF DESCRIPTION

According to one embodiment of the invention, a modular power distribution device includes a base, a circuit protection device, an electronically actuated power distribution device, and an electronic control module. The base has a first side and a second side, where the first side is configured to be mounted to a control panel, the second side is opposite the first side, and the second side includes a first mounting section and a second mounting section. The circuit protection device is configured to be mounted to the first mounting section of the base. The circuit protection device includes multiple input terminals configured to receive power conductors and multiple output connections. The electronically actuated power distribution device is configured to be mounted to the second mounting section of the base. The electronically actuated power distribution device includes multiple input connections and multiple output terminals configured to receive conductors for supplying power to a controlled device. The input connections are configured to connect to the output connections of the circuit protection device. The electronic control module is configured to physically mount to either the circuit protection device or the electronically actuated power distribution device. The electronic control module includes a plug configured to receive a network connection, an electrical connection to the circuit protection device, and an electrical connection to the electronically actuated power distribution device.

According to another embodiment of the invention, a modular power distribution system includes a communication module and at least one power distribution device. The communication module includes a first port configured to be connected to an industrial network and a second port configured to be connected to a plurality of industrial control devices. Each modular power distribution devices includes a base having a first mounting section and a second mounting section, a circuit protection device configured to slidably engage the first mounting section of the base, an electronically actuated power distribution device configured to slidably engage the second mounting section of the base, and an electronic control module configured to mount via a snap-fit to either the circuit protection device or the electronically actuated power distribution device. The electronic control module includes a plug configured to receive a network connection from the communication module, an electrical connection to the circuit protection device, and an electrical connection to the electronically actuated power distribution device.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
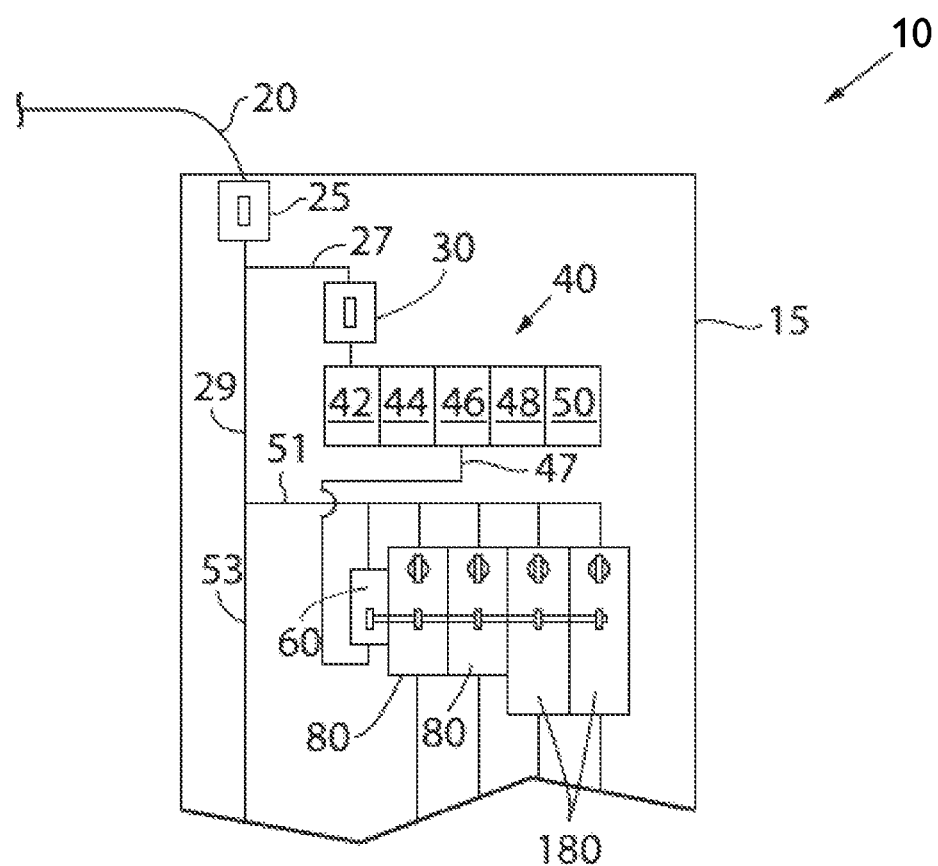
FIG. 1 is a partial front elevation view of an exemplary control cabinet incorporating one embodiment of the modular low voltage power distribution module.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a modular power distribution device that provides tool-less interconnections of modules for ease of assembly. A base is provided that may be snap-fit onto a DIN rail. The base includes a first mounting section and a second mounting section. The first mounting section is configured to receive a circuit protection device, and the second mounting section is configured to receive an electronically actuated power distribution device. The two mounting sections are offset from each other to align the circuit protection device with the electronically actuated power distribution device. The circuit protection device is configured to slide on to the first mounting section and includes multiple input terminals, configured to receive power conductors, and multiple output connections. The electronically actuated power distribution device is configured to slide on to the second mounting section and includes multiple input connections configured to engage the output connections of the circuit protection device as the power distribution device slides on to the second mounting section. The electronically actuated power distribution device also includes multiple output terminals configured to supply power to a device in the controlled machine or process. An electronic control module is snap-fit to either the circuit protection device or the electronically actuated power distribution device. As the electronic control module is physically mounted to the assembly, a first electrical connection is made between the electronic control module and the circuit protection device and a second electrical connection is made between the electronic control module and the electronically actuated power distribution device. The electronic control module includes a port by which control signals are received and feedback signals may be transmitted. The circuit protection device, electronically actuated power distribution device, and electronic control module are all configured to be manually mounted to the base or to each other by tool-less connections and plug-in interconnections between the modules mounted on a single base.

Turning initially to FIG. 1, an exemplary control cabinet 15 in a power distribution system 10 is illustrated. The control cabinet receives a power feed 20, which may be a single-phase alternating current (AC) power feed, a multi-phase AC power feed, or a direct current (DC) power feed according to the application requirements. A main circuit breaker 25 within the control cabinet 15 receives the power feed 20 and may be manually activated to enable/disable power within the control cabinet 15. According to the illustrated embodiment, the main circuit breaker 25 includes a first branch 27 and a second branch 29 at the output of the main circuit breaker 25. The illustrated embodiment is intended to be exemplary and illustrates only two branches for convenience. It is contemplated that any number of power branches may be distributed from the main circuit breaker 25.

The first branch circuit 27 is connected to a secondary circuit breaker 30 and supplies power to an industrial controller 40. The industrial controller 40 may be, for example, a programmable logic controller (PLC) or a programmable activity controller (PAC). The illustrated industrial controller 40 includes a power supply module 42, a processor module 44, a network module 46, an input module 48 and an output module 50. It is contemplated that the industrial controller may be made up of numerous different modules connected together in a rack or mounted to a rail. Additional modules may be added or existing modules removed and the industrial controller 40 reconfigured to accommodate the new configuration. Optionally, the industrial controller 40 may have a predetermined and fixed configuration.

The second branch circuit 29 includes still two additional branches. A third branch 51 is connected to multiple modular power distribution devices 80, 180, and a fourth branch 53 is shown extending on to still other devices not shown in the figure. The third branch 51 is connected to a communication module 60, two modular power distribution devices 80 which include a contactor module 120 (see FIG. 4) and to two modular power distribution devices 180 which include a motor starter 220 (see FIG. 3).

The communication module 60 is part of an industrial network that extends between the industrial controller 40 and various devices within a machine or process that is being controlled by the industrial controller 40. A network cable 47 is connected between the network module 46 and the communication module 60. It is contemplated that the network cable 47 may be a custom cable configured to communicate via a proprietary interface or may be a standard industrial cable for a non-proprietary network. Exemplary non-proprietary networks include Ethernet/IP®, DeviceNet®, or ControlNet®. The network cable 47 connects the industrial controller 40 to the communication module 60 in a point-to-point configuration. It is contemplated that other network arrangements are possible for coupling the elements of the network, including arrangements that have switches that allow for redundancy communication paths, daisy-chain arrangements, star (simple or multi-layered) arrangements, ring-networks or more complicated topologies such as redundant local area networks (LANs). The network module 46 and communication module 60 are each configured to communicate according to the protocol of the network to which it is connected and may be further configured to translate messages between two different network protocols. Although illustrated as a wired network, where the connection is established via a network cable 47, it is further contemplated that the network may also include wireless connections.

Figure 2:
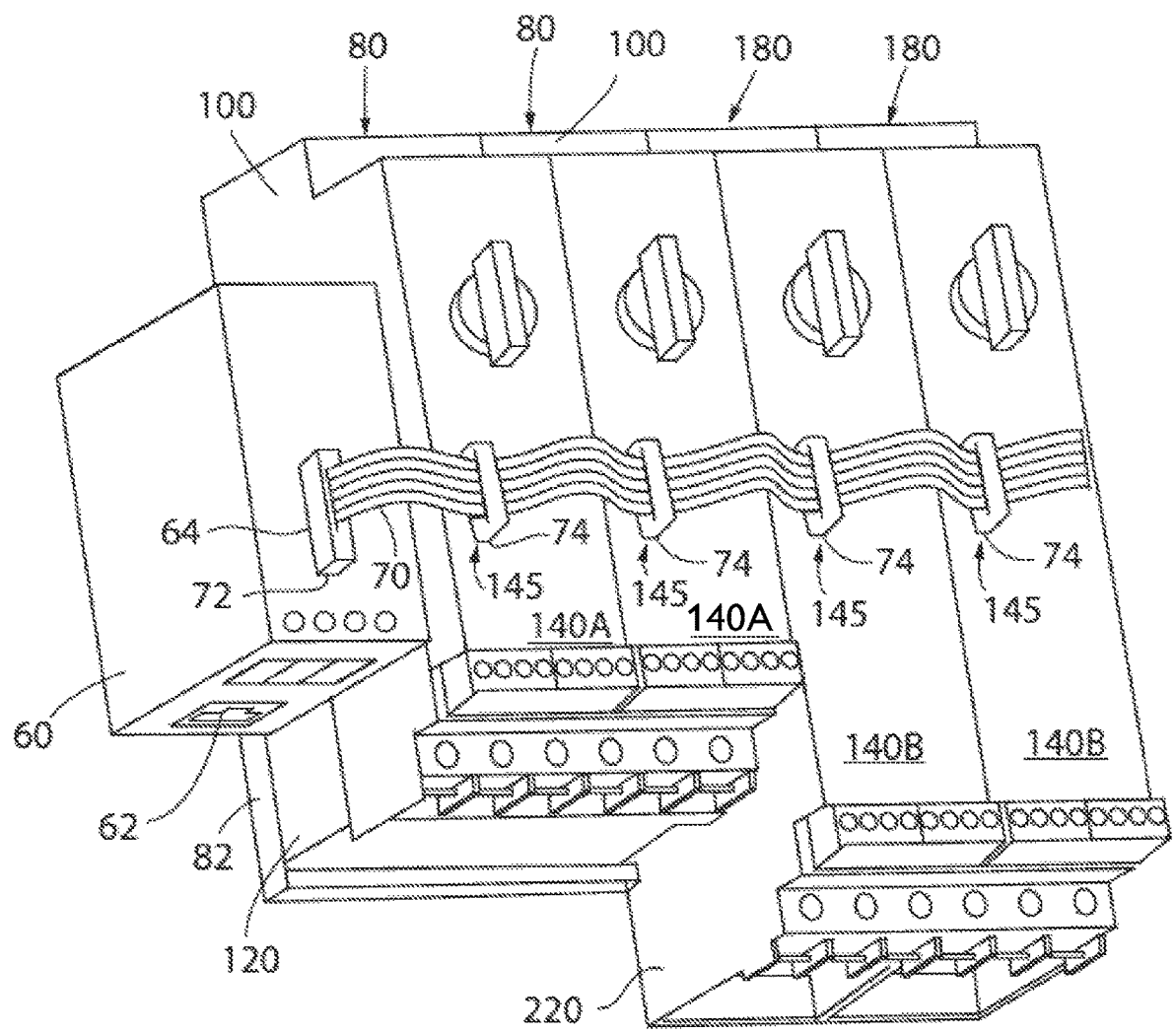
FIG. 2 is a perspective view of an exemplary power distribution system including one communication module, two power distribution devices with contactors, and two power distribution devices with motor starters.

Turning next to FIG. 2, the communication module 60 includes a first port 62 configured to receive a connector on the network cable 47. The communication module 60 further includes a second port 64 configured to communicate with the modular power distribution devices 80, 180. A ribbon cable 70 has a terminal connector 72 on one end that plugs in to the second port 64 and pass-through connectors 74 that plug into a communication port 145 on each of the modular power distribution devices 80, 180. Optionally, each of the modular power distribution devices 80, 180 may include a pair of communication ports 145 and separate cables, rather than a single ribbon cable, may be run between adjacent devices.

Figure 4:
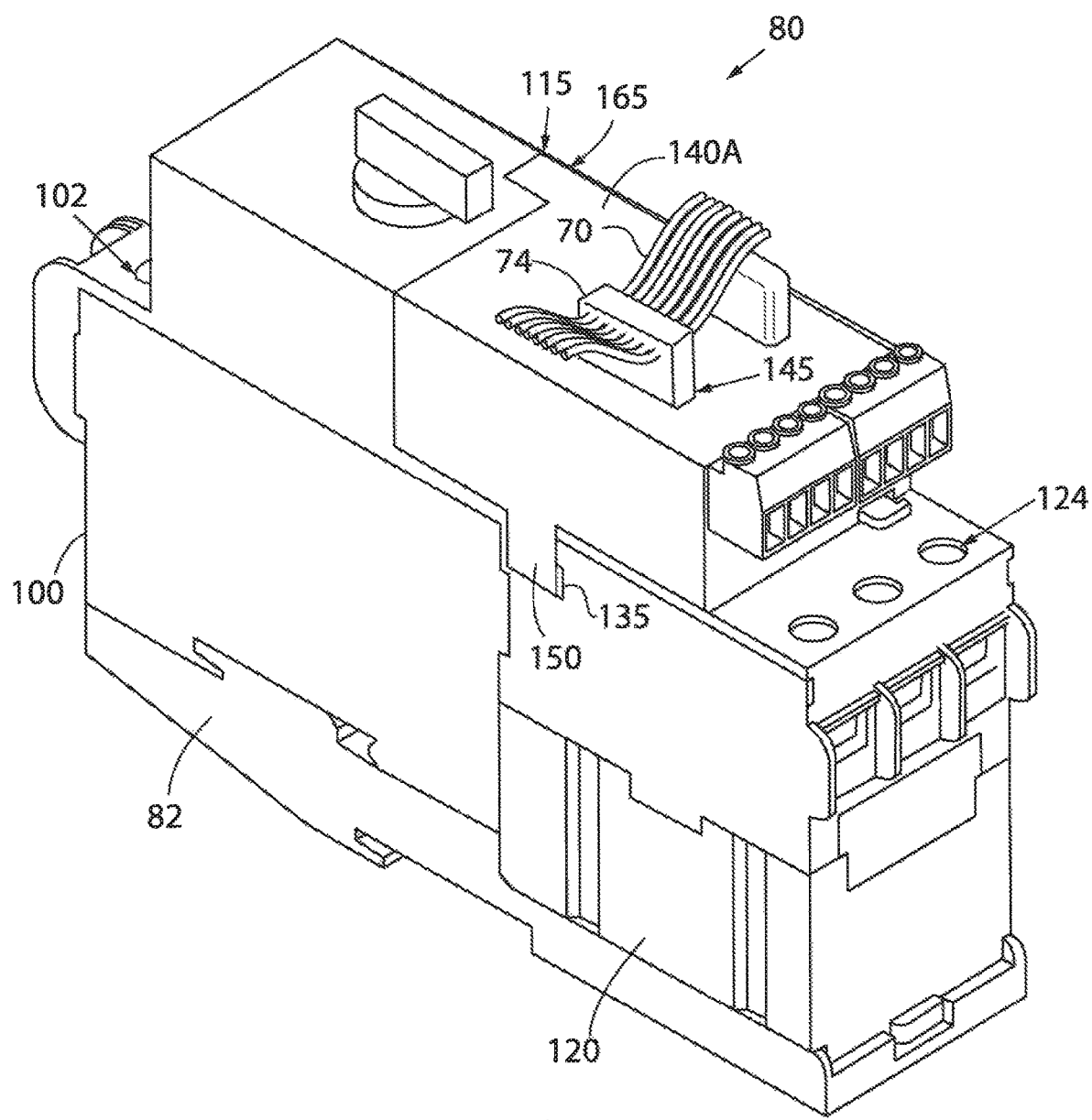
FIG. 4 is a perspective view of one power distribution device with a contactor.
Figure 6:
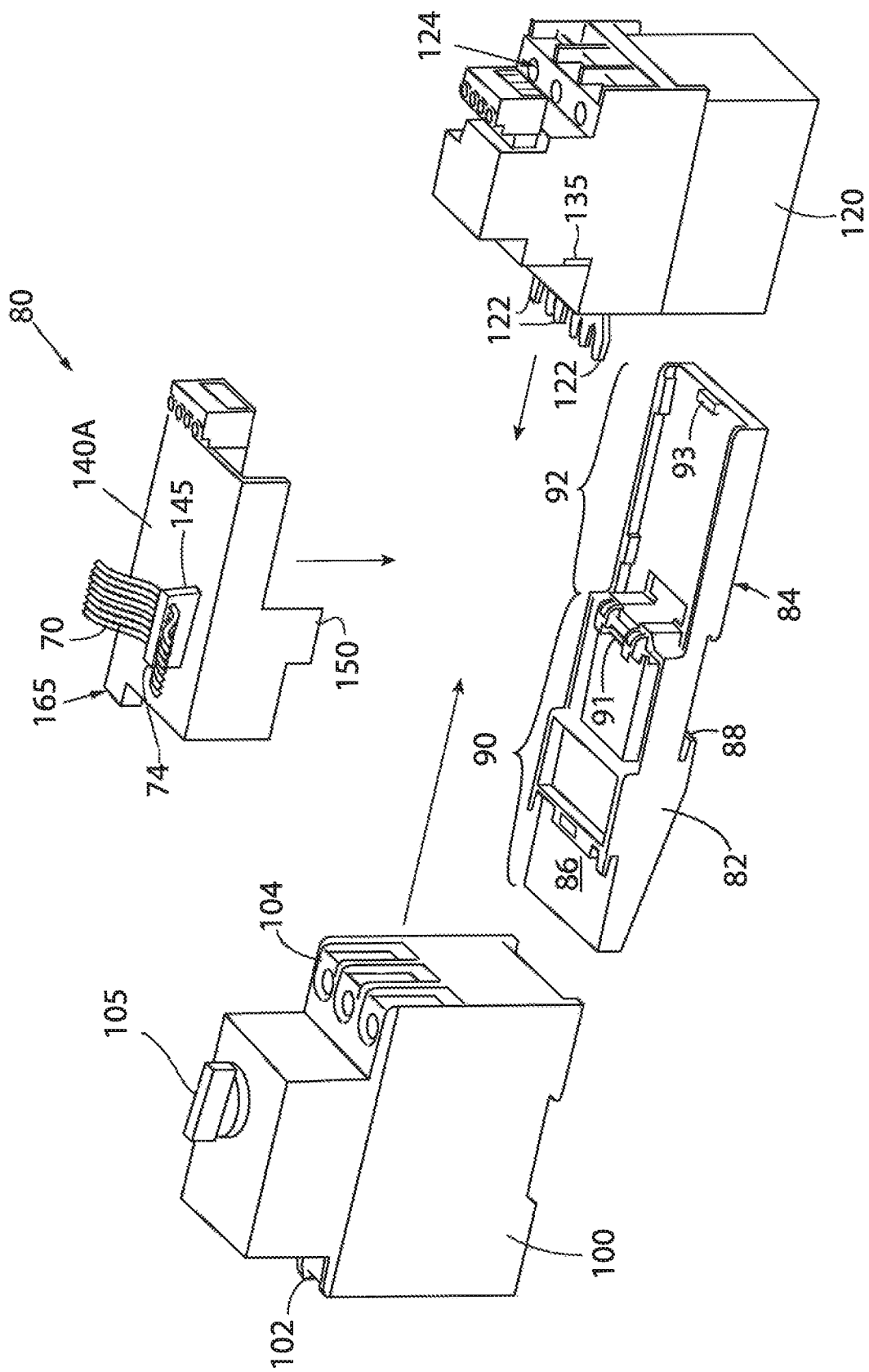
FIG. 6 is an exploded view of the power distribution device of FIG. 4.

With reference next to FIG. 4, a base 82 is provided on which a circuit protection device 100 and an electronically actuated power distribution device is mounted. It is contemplated that the electronically actuated power distribution device may be a contactor 120, motor starter 220, or motor drive (not shown). As illustrated in FIG. 4, the electronically actuated power distribution device is a contactor 120. With reference also to FIG. 6, the base 82 includes a first side 84 configured to be mounted to a control panel and a second side 86, where the second side is opposite the first side. The first side 84 includes a channel 88 configured to receive a DIN rail within the channel. The DIN rail is first secured to the control panel and the modular power distribution device 80 is mounted, in turn, to the DIN rail. The second side 86 includes a first mounting section 90 and a second mounting section 92.

The first mounting section 90 is configured to receive the circuit protection device 100, and the second mounting section 92 is configured to receive the electronically actuated power distribution device. The circuit protection device 100 slides on to the first mounting section 90. A flexible tab 91 may be deflected downward as the circuit protection device 100 is slid on to the base 82 and returns to its original position into a recess on the circuit protection device 100 as the circuit protection device fully engages the base 82 such that the flexible tab 91 positively retains the circuit protection device 100 on the base 82. The tab 91 may be manually deflected downward to release the circuit protection device 100 and to allow it to be slid off of the base 82. The contactor 120 slides on to the second mounting section 92. A flexible tab 93 may be deflected downward as the contactor 120 is slid on to the base 82 and returns to its original position into a recess on the contactor 120 as the contactor fully engages the base 82 such that the flexible tab 93 positively retains the contactor 120 on the base 82. The tab 93 may be manually deflected downward to release the contactor 120 and to allow it to be slid off of the base 82. Both the circuit protection device 100 and the electronically actuated power distribution device may be mounted to the base 82 without requiring a tool for mounting. Further, the base 82 may be snap fit onto the DIN rail such that each of the components in the modular power distribution device 80, 180 are mounted to the other without requiring tools for installation.

In operation, each modular power distribution device 80, 180 is controlled to selectively supply power from the third branch 51 to a device on the controlled machine or process. The circuit protection device 100 includes a plurality of input terminals 102 configured to receive power conductors from the third power branch 51. It is contemplated that the circuit protection device 100 may be configured to receive single-phase AC voltage and include two input terminals 102 for power conductors. Single phase power includes a "hot" and a neutral conductor. Optionally, the circuit protection device 100 may be configured to receive a multi-phase (e.g., three-phase) AC voltage and include an input terminal 102 for each phase. The power conductors are electrical wires of suitable construction (e.g., solid or stranded) and of suitable wire gauge according to the current requirements of the application. The input terminals 102 may be screw terminals, as shown, requiring a screw driver for the connection of the conductors to the modular power distribution device 80.

Figure 5:
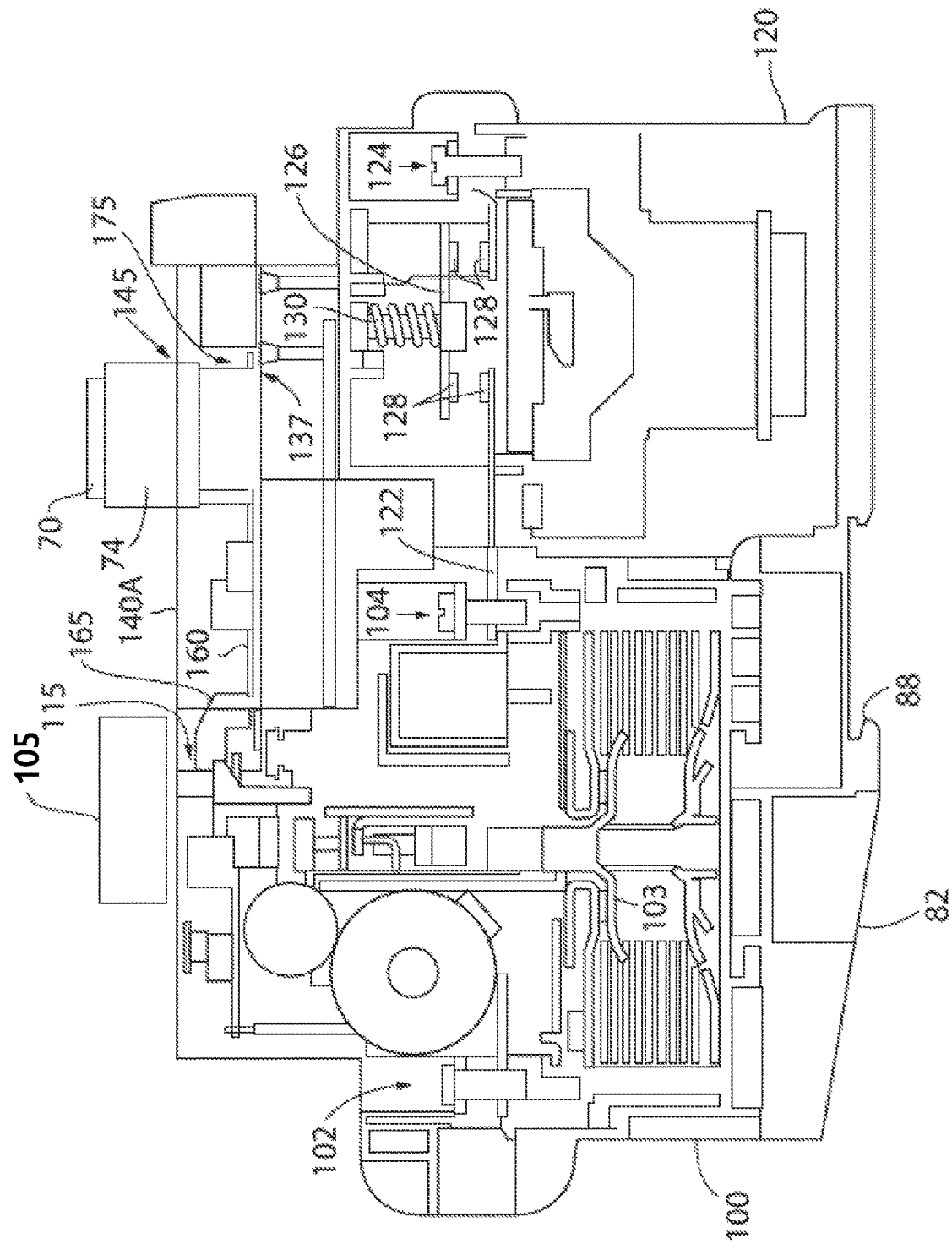
FIG. 5 is a sectional view of the power distribution device of FIG. 4.

With reference also to FIG. 5, the input terminals 102 are connected through a switching member 103 to output connections 104 on the circuit protection device 100. The switching member 103 may be manually opened or closed. A dial 105, lever, or other such manual switching device is provided and may be turned, flipped, toggled, or the like to move the switching member 103 between an open and a closed position. In the open position, no current may be conducted through the circuit protection device 100. In the closed position, the current may be conducted, via the switching member 103 between the input terminals 102 and the output connections 104. The circuit protection device 100 also includes overcurrent protection. The overcurrent protection may be of any suitable method of detecting excessive current in the device including, but not limited to thermal, magnetic, or current transformers. When the current exceeds a rating for the circuit protection device 100, the switching member 103 is opened by the overcurrent protection. The circuit protection device may be manually or electronically reset after the excessive current flow is no longer present.

Figure 3:
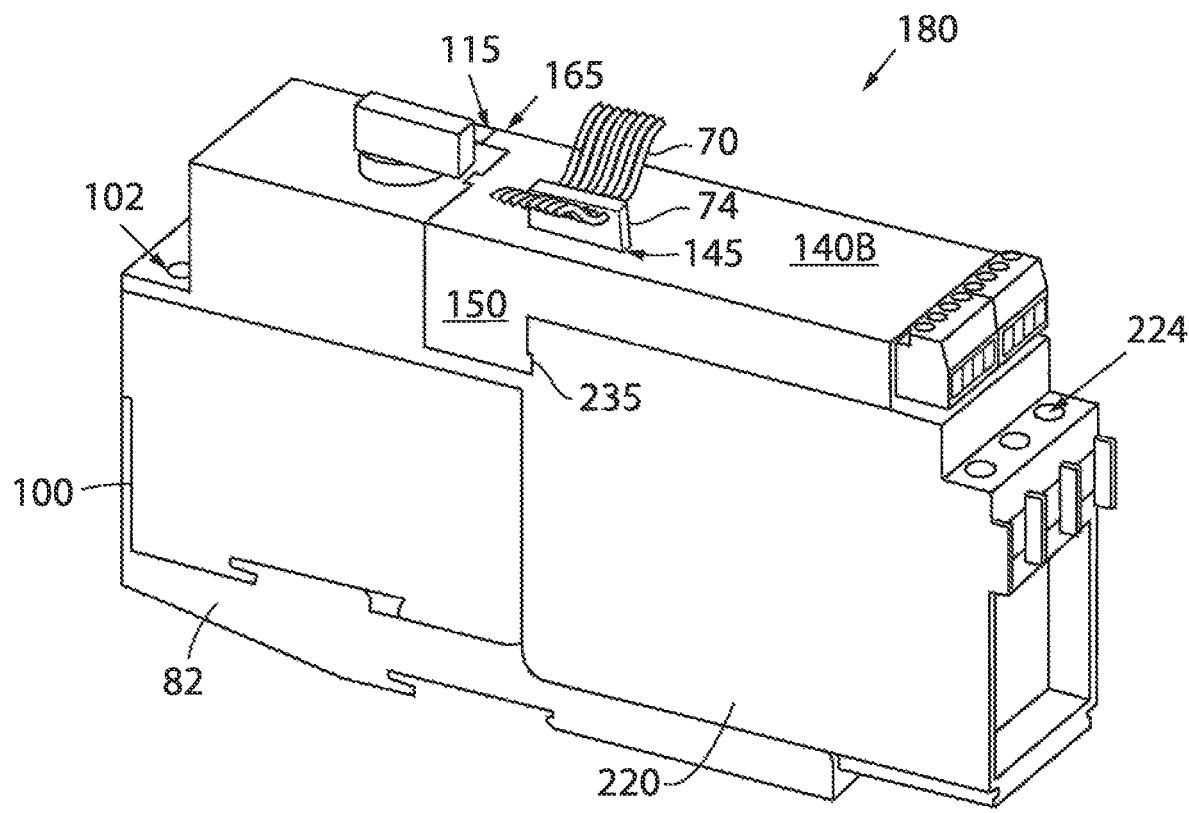
FIG. 3 is a perspective view of one power distribution device with a motor starter.

Under normal operating conditions, the circuit protection device 100 selectively conducts the voltage from the branch circuit 51 to an electronically actuated power distribution device. With reference to FIG. 3, the electronically actuated power distribution device may be a motor starter 220. With reference to FIG. 4, the electronically actuated power distribution device may be a contactor 120. According to still another embodiment, the electronically actuated power distribution device may be a motor drive. The electronically actuated power distribution device is any device that receives an electronic control signal and selectively delivers power from the circuit protection device 100 to another device in the controlled system.

Turning next to FIGS. 5 and 6, the contactor 120 includes multiple input connections 122 and multiple output terminals 124. The input connections 122 are configured to engage the output connections 104 of the circuit protection device 100. According to the illustrated embodiment, the output connections 104 of the circuit protection device 100 are screw terminals, which are configured to receive the input connections 122 of the electronically actuated power distribution device 120. The input connections 122 are fixed metal conductors extending from the electronically actuated power distribution device 120. The distal end of each connection 122 is pronged such that it may fit around the screw in the screw terminal 104 of the circuit protection device 100. Although the illustrated embodiment requires a screw driver to secure the pronged connector in the screw terminal, no separate wiring is required between the two devices, eliminating the potential for miswiring between the devices. Instead, each pronged connector 122 on the electronically actuated power distribution device 120 is inserted into the corresponding output connection 104 of the circuit protection device 100 as the electronically actuated power distribution device 120 slides on to the base 82. The screw terminals may be required according to application requirements related, for example, to connecting power terminals of devices and to the current ratings of each device. It is contemplated that, if application requirements permit, the output connections 104 may include spring-terminals to positively engage the input connections 122 as the electronically actuated power distribution device is fit onto the base 82.

The contactor 120 is configured to selectively connect the output terminals 124 with the input connections 122 of the contactor 120. As seen in FIG. 5, a switching member 126 is movable between a first position (as shown) and a second position. The switching member 126 is a conductive material which includes a set of contacts 128 on one surface. A complementary set of contacts 128 are included on the interior end of the input connections 122 and the interior end of the output terminals 124. In the second position, the switching member 126 moves downward such that the contacts 128 on the switching member 126 engage the contacts 128 on the input connections 122 and the output terminals 124, thereby establishing an electrical conduction path therebetween. A control signal, received at the contactor 120 energizes an actuator, such as a coil element, where the coil element establishes an electromagnetic field which, in turn, causes translation motion on a plunger, or metal rod within the coil element. The plunger is, in turn, connected to the switching member 126 to move the switching member between the open and closed position. When the control signal is removed, a spring 130 causes the switching member 126 to return to its original position.

With reference to FIG. 3, a motor starter 220 may be fit onto the base 82 in the place of the contactor 120 previously discussed. The motor starter 220 is similarly configured with input connections configured to engage the output connections 104 of the circuit protection device 100. However, rather than only providing a conductive path between the circuit protection device 100 and external devices, the motor starter 220 is configured to provide a variable output voltage at the output terminals 224. The output voltage may have a variable amplitude and frequency and is used to accelerate a motor connected to the output terminals 224 according to a predefined acceleration profile. The motor starter 220 may include a number of control parameters, configurable to define a desired acceleration profile. The motor starter 220 receives a control signal indicating operation of the motor connected to the output terminals 224 is desired and, in turn, accelerates the motor up to a desired operating speed and then maintains operation of the motor at the desired speed while the control signal is present.

Each of the contactor 120 and the motor starter 220 require control signals in order to selectively provide the voltage from the circuit protection device 100 to a remote device connected at their respective output terminals 124, 224. An electronic control module 140 (140A, 140B) is connected to the modular power distribution device 80, 180 to receive these control signals. The electronic control module 140 (140A, 140B) is configured to physically mount to either the circuit protection device 100, the electronically actuated power distribution device 120, 220, or a combination thereof. A tab 150 protruding downward from the electronic control module 140 (140A, 140B) is configured to be snap fit to a complementary tab 135, 235. The tab on the electronic control module 140 (140A, 140B) extends down between the circuit protection device 100 and the electronically actuated power distribution device 80, 180. Consequently, the complementary tab may be on one device or the other. Optionally, both devices may include a tab to more securely retain the electronic control module 140 (140A, 140B) to the modular power distribution device. The snap-fit of the electronic control module 140 (140A, 140B) allows the module to be mounted to the rest of the modular power distribution device 80, 180 without requiring a tool for installation. A first electronic control module 140A is illustrated in FIG. 4 as mounting to a contactor module 120, and a second electronic control module 140B is illustrated in FIG. 3 as mounting to a starter module 220. It is contemplated that the electronic control modules 140 (140A, 140B) include identical components but are sized differently to cover the respective electronically actuated power distribution device to which they are mounted.

The electronic control module 140 includes a communication port 145 to which a ribbon cable connector 74 and the corresponding network cable 70 are connected. The ribbon cable 70 provides for a daisy chain connection between the communication module 60 and each modular power distribution device 80, 180. With reference also to FIG. 5, each electronic control module includes a printed circuit board 160 configured to include a control circuit. The control circuit is configured to receive data, such as control signals, from the communication port 145 and to transmit the control signals to either the circuit protection device 100 or the electronically actuated power distribution device 120, 220. The control circuit is also configured to receive feedback signals from either the circuit protection device 100 or the electronically actuated power distribution device 120, 220 and to package the feedback signals into data packets according to the network protocol for transmission from the communication port 145. The feedback signals correspond to the present operating conditions of either the circuit protection device 100 or the electronically actuated power distribution device 120, 220. The circuit protection device 100 may include, for example, a microswitch providing a signal corresponding to the status of the switching member 103. The circuit protection device 100 may also include a current transformer measuring an amplitude of current. As still another option, the circuit protection device 100 may generate a fault signal indicating when the overcurrent protection in the device has tripped. If the electronically actuated power distribution device includes a contactor module 120, feedback signals may be provided indicating whether the switching member 126 is in an open or closed state. If the electronically actuated power distribution device is a motor starter module 220, various feedback signals may be generated indicating, for example, when the motor is accelerating, up to speed, at zero speed or the like. Each of the control signals and/or feedback signals corresponds to a signal which traditionally has been transferred back to a central controller 40 via individual conductors. Transmitting the control signals and/or feedback signals via the ribbon cable 70 reduces wiring complexity and the potential for wiring errors.

A first electrical connection is established between a first connector 165 on the circuit board 160 and a complementary connector 115 on the circuit protection device 100. A second electrical connection is established between a second connector 175 on the circuit board 160 and a complementary connector 137 on the electronically actuated power distribution device 120, 220. The first and second electrical connectors 165, 175 on the circuit board 160 are configured such that each may be press-fit, snap-fit, or the like as the electronic control module 140 is being connected to the circuit protection device 100 and/or the electronically actuated power distribution device. The resultant first and second electrical connections are thereby established without requiring a tool or any additional wiring to make the interconnections.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

I claim:

1. A modular power distribution device, comprising:
   a base having a first side and a second side, wherein:
      the first side is configured to be mounted to a control panel,
      the second side is opposite the first side, and
      the second side includes a first mounting section and a second mounting section;
   a circuit protection device configured to be mounted to the first mounting section of the base, the circuit protection device including:
      a plurality of input terminals configured to receive power conductors, and
      a plurality of output connections;
   an electronically actuated power distribution device configured to be mounted to the second mounting section of the base and configured to engage with the circuit protection device, the electronically actuated power distribution device including:
      a plurality of input connections, wherein the plurality of input connections are configured to connect to the plurality of output connections of the circuit protection device; and
      a plurality of output terminals configured to receive conductors for supplying power to a controlled device; and
   an electronic control module configured to physically mount to at least one of the circuit protection device or the electronically actuated power distribution device, the electronic control module disposed external to the base, the electronic control module including:
      a port configured to receive an interconnect connection,
      an electrical connection to the circuit protection device, and
      an electrical connection to the electronically actuated power distribution device.

2. The modular power distribution device of claim 1 wherein:
   the circuit protection is configured to mount to the first mounting section of the base without requiring a tool for mounting;
   the electronically actuated power distribution device is configured to be mounted to the second mounting section of the base without requiring a tool for mounting; and
   the electronic control module is configured to physically mount to the at least one of the circuit protection device or the electronically actuated power distribution device without requiring a tool for mounting.

3. The modular power distribution device of claim 1 wherein the electronically actuated power distribution device is either a contactor or a motor starter.

4. The modular power distribution device of claim 1 wherein the first side of the base is configured to mount to a DIN rail.

5. The modular power distribution device of claim 1 wherein the circuit protection device is configured to slidably engage the first mounting section.

6. The modular power distribution device of claim 1 wherein the electronically actuated power distribution device is configured to slidably engage the second mounting section of the base and the plurality of input connections on the electronically actuated power distribution device are configured to slidably engage the plurality of output connections on the circuit protection device as the electronically actuated power distribution device slidable engages the second mounting section.

7. The modular power distribution device of claim 1 wherein the base includes a tab configured to deflect downward as the electronically actuated power distribution device slides on the base and to return to an original position when the electronically actuated power distribution device is on the base and wherein the tab is configured to positively retain the electronically actuated power distribution device on the base.

8. The modular power distribution device of claim 1 wherein:
the interconnect connection is configured to receive an interconnect cable,
at least one control signal is delivered to the electronically actuated power distribution device via the interconnect cable, and
the control signal is configured to selectively enable the electronically actuated power distribution device.

9. The modular power distribution device of claim 8 wherein the interconnect cable is further configured to transmit at least one feedback signal from the modular power distribution device to a remote device.

10. The modular power distribution device of claim 1 wherein the electronic control module further includes a communication interface configured to transmit and receive data packets via the port.

11. A modular power distribution system, comprising:
a communication module including a first port configured to be connected to an industrial network and a second port; and
at least one modular power distribution device, each of the at least one modular power distribution devices including:
a base having a first mounting section and a second mounting section;
a circuit protection device configured to slidably engage the first mounting section of the base;
an electronically actuated power distribution device configured to slidably engage the second mounting section of the base and configured to engage with the circuit protection device; and
an electronic control module configured to mount via a snap-fit to at least one of the circuit protection device or the electronically actuated power distribution device, the electronic control module disposed external to the base, the electronic control module including:
a module port configured to receive an interconnect connection from the second port of the communication module,
an electrical connection to the circuit protection device, and
an electrical connection to the electronically actuated power distribution device.

12. The modular power distribution system of claim 11 wherein the electronically actuated power distribution device is either a contactor or a motor starter.

13. The modular power distribution system of claim 11 wherein the base is configured to mount to a DIN rail.

14. The modular power distribution system of claim 11 wherein:
the circuit protection device includes:
a plurality of input terminals configured to receive power conductors, and a plurality of output connections;
the electronically actuated power distribution device includes:
a plurality of input connections, wherein the plurality of input connections are configured to slidably engage the plurality of output connections of the circuit protection device as the electronically actuated power distribution device is mounted to the base; and
a plurality of output terminals configured to receive conductors for supplying power to a controlled device.

15. The modular power distribution system of claim 11 wherein the base includes a tab configured to deflect downward as the electronically actuated power distribution device slides on the base and to return to an original position when the electronically actuated power distribution device is on the base and wherein the tab is configured to positively retain the electronically actuated power distribution device on the base.

16. The modular power distribution system of claim 11 wherein the communication module is configured to:
receive an industrial network cable from the industrial network at the first port, and receive an interconnect cable at the second port, wherein the interconnect cable is configured to operatively connect between the communication module and each of the at least one modular power distribution devices.

17. The modular power distribution system of claim 16 wherein the communication module is configured to:
receive a plurality of first data packets in a first protocol from the industrial network,
convert the plurality of first data packets in the first protocol to a set of converted first data packets in a second protocol,
transmit the set of converted first data packets via the interconnect cable,
receive a plurality of second data packets in the second protocol from the interconnect cable,
convert the plurality of second data packets in the second protocol to a set of converted second data packets in the first protocol, and
transmit the set of converted second data packets via the industrial network.

18. The modular power distribution system of claim 17, wherein:
the plurality of first data packets in the first protocol include at least one control signal to selectively enable the electronically actuated power distribution device, and
the communication module delivers the control signal to the electronically actuated power distribution device via the set of converted first data packets in the second protocol.

19. The modular power distribution system of claim 17 wherein:
the communication module is configured to receive at least one feedback signal from the modular power distribution device via the plurality of second data packets in the second protocol, and
the communication module transmits the at least one feedback signal to a remote device via the set of converted second data packets in the first protocol on the industrial network.

20. The modular power distribution system of claim 17 wherein the electronic control module further includes a communication interface configured to transmit the plurality of second data packets in the second protocol and receive the set of converted first data packets in the second protocol via the module port.

* * * * *